UNITED STATES PATENT OFFICE.

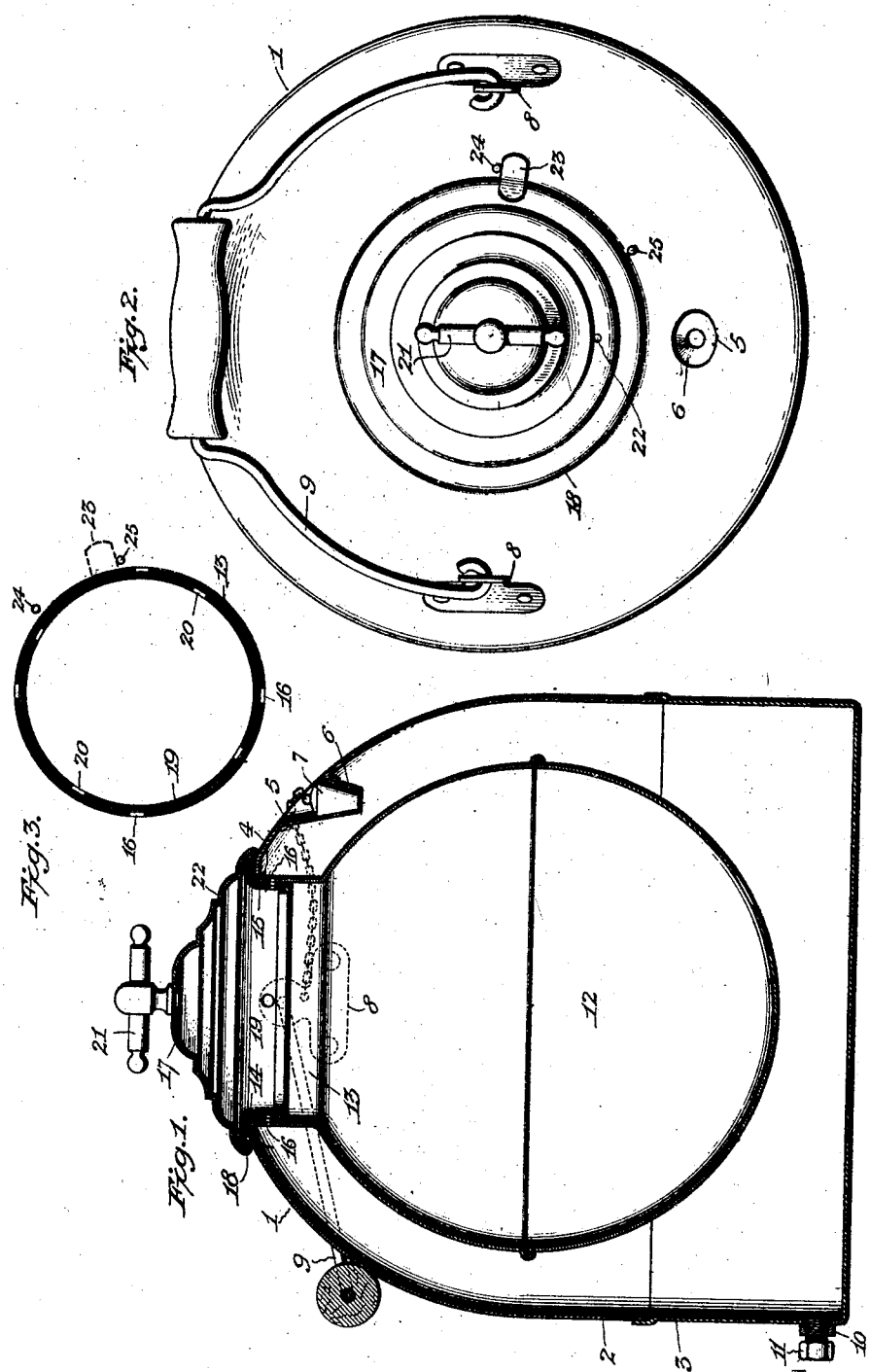

HENRY S. MURRAY, OF DENVER, COLORADO.

COOKING UTENSIL.

1,318,790.  Specification of Letters Patent.  Patented Oct. 14, 1919.

Application filed December 31, 1918. Serial No. 269,055.

*To all whom it may concern:*

Be it known that I, HENRY S. MURRAY, a citizen of the United States of America, residing at the city and county of Denver and State of Colorado, have invented a new and useful Cooking Utensil, of which the following is a specification.

This invention relates to improvements in cooking utensils, and particularly to that class of cooking utensils known as double boilers.

The object of the invention is to provide a double boiler comprising a substantially spherical inner member or container, and an outer water holding casing or jacket which is spaced from the inner member or container, the upper half of the jacket being concentric with the said container, the said container being provided with a short neck, which is secured in an opening in the jacket, and which forms an inlet to the container, the jacket and container being inseparable, thus forming a unitary structure, a lid being employed to close the container having a rim portion which fits into the said neck.

Further, to provide a utensil comprising a substantially spherical container having a short neck, and a substantially semi-spherical jacket having an opening in which the said neck is secured, the said neck having a plurality of apertures, a lid or cover being employed having a rim portion which fits snugly within the said neck, and which is also provided with a number of apertures corresponding to those in the neck, whereby, when the lid is positioned to cause its apertures to register with those in the neck, communication between the jacket and the container is established, such communication being closed when the lid is turned to close the apertures in the neck, the said jacket having a filling inlet, and a normally closed outlet, by means of which sediment or scale may be removed from the jacket when necessary, the said utensil being adapted to eliminate pressure and to accomplish the highest cooking efficiency without the services of a skilled attendant.

These objects are accomplished by the device illustrated in the accompanying drawings, in which:

Figure 1 is a vertical sectional view of the improved cooking utensil.

Fig. 2 is a plan view thereof, and

Fig. 3 is a diagrammatic view illustrating cut-off arrangement, by which communication between the container and jacket is either opened or closed.

In the common type of double boiler, the sides of the container and jacket are straight, and therefore the container presents a much smaller area to the action of the steam or boiling water in the jacket, than is the case in the present utensil, the container of which, being substantially spherical, affords a maximum heating surface, which extends partially over the contents of the container, thereby producing uniformity in temperature, both above and below the article placed in the container, which insures a thorough cooking action in a relatively short time.

Referring to the accompanying drawings:

The numeral 1, indicates the casing or jacket, which may be constructed of any suitable metal and which is substantially semi-spherical in form. This jacket comprises two parts, the upper or semi-spherical member 2, and the lower member 3, which is connected to the upper member by a steam tight joint in any suitable manner, preferably without the use of solder, the lower member being attached, after the container is secured in place, as will be understood.

The upper member is provided with an axial opening 4, on one side of which is an opening 5, in which is secured a short depending conical filling tube 6, by means of which the jacket is filled to the required depth with water. This tube is normally closed by a stopper 7, preferably a metal stopper having a ground surface, which causes it to fit frictionally in the tube. This stopper is preferably connected to one of a pair of ears 8, by a chain, to prevent the same being mislaid. The ears 8, are secured upon opposite sides of the jacket, as shown, and are formed with holes, in which are pivotally supported the hooked ends of an ordinary bail or handle 9.

The lower member 3, of the jacket, has a hole near its bottom, in which is suitably secured an internally threaded nipple 10, in which is screwed a plug 11, having a wrench receiving head, and this plug, which normally prevents the escape of water from the jacket, may be withdrawn when it is desired to remove any sediment or scale which may have formed and settled in the jacket. Within the jacket is suspended the food container 12, which is arranged and constructed as follows: The container is substantially spherical in form, and may be made of any suitable metal. As shown, it is constructed of two semi-spherical members, united by a steam tight joint, but the invention also contemplates making it of a single piece of metal. The upper end of the container terminates in a short neck 13, the upper end of which is inserted in the opening 4, of the jacket, and this end is formed with a narrow flange 14, which rests on the marginal edge of the hole 4, and is secured thereto in any suitable steam tight manner. A sleeve 15, which is about half the length of the neck, is also tightly fitted in the neck, and the outer end of this sleeve is formed with a narrow flange which rests upon and is secured to the flange of the neck. Through the sleeve and the neck are formed a plurality of equidistant, registering holes 16, and the inner face of the sleeve is given a smooth finish. The container is closed by a cap or lid 17, having a flange portion 18, which rests on the jacket, and a depending band portion or rim 19, which fits snugly in the sleeve 15, and is smooth finished on its outer face to make a tight connection with the sleeve, but which permits the lid to be turned within the sleeve. The rim 19, is formed with holes 20, corresponding in number to those in the sleeve, and when the lid is turned, by means of its handle 21, so that its holes register with those in the sleeve, communication between the jacket and the container is established and moist steam passes from the jacket into the container, where a portion of it is condensed and settles upon the article of food in the said container, thereby serving to baste the same, this being essential in cooking fowl or meats. The basting process may be continuous, or it may be dispensed with at intervals, by turning the lid, to close communication between the jacket and the container, and an excess of steam in the container is prevented by a vent hole 22, in the lid, which permits the steam to escape. When an article is being cooked which does not require basting, the lid is turned to prevent the steam from the jacket entering the container, and excess pressure in the jacket would then find a vent through the filling tube, the stopper of which would be unseated sufficiently to permit the escape of steam, or the stopper could be removed if desired.

In order to define the turning movement of the lid, to cause the holes therein to register with those in the neck of the container, the lid is provided with a finger 23, which projects a slight distance beyond the flange of the lid and rests on the jacket. The jacket is provided with two stop pins 24 and 25, with one or the other of which the finger is adapted to contact. When the finger contacts with the pin 24, the holes in the lid and in the neck register, and when the lid is turned so that the finger contacts with the pin 25, the rim of the lid closes the holes in the neck and thus cuts off communication between the jacket and container.

The container may be easily cleaned, and as the utensil is in the form of a unitary structure, the accidental misplacing of the parts is prevented.

Having described my invention, what I claim as new and desire to secure by Letters Patent, is:

In a utensil of the character described, a unitary structure comprising a substantially semi-spherical casing or jacket having a circular axial opening in its dome, a substantially spherical container within the jacket and spaced therefrom, having a neck which extends through the opening in the dome and terminates in an annular flange which is secured upon the dome around the said opening, a sleeve in said neck having a finished inner face, and terminating in an annular flange which is secured upon the flange of the neck, said neck and its sleeve having a plurality of holes communicating with the jacket; a removable lid having a depending band or rim which fits snugly within the said sleeve and is provided with a number of holes corresponding to those in the sleeve, stops on the dome and a finger on the lid adapted to engage one or the other of the stops to indicate when the holes in the lid rim register with those in the sleeve or when the said rim closes the holes in the sleeve, said lid having a vent hole, said jacket having an inlet in its dome and an outlet adjacent the bottom thereof.

In testimony whereof I affix my signature in presence of two witnesses.

HENRY S. MURRAY.

Witnesses:
ELIZABETH SMITH,
HUGH D. WATSON.

Copies of this patent may be obtained for five cents each, by addressing the "Commissioner of Patents, Washington, D. C."